United States Patent [19]

Bochan

[11] 4,019,397
[45] Apr. 26, 1977

[54] BELT DRIVE MECHANISM

[75] Inventor: John Bochan, Louisville, Ky.

[73] Assignee: General Electric Company, Louisville, Ky.

[22] Filed: Oct. 6, 1975

[21] Appl. No.: 619,692

[52] U.S. Cl. .......................... 74/227; 74/242.11 R; 74/242.15 R

[51] Int. Cl.² ..................... F16H 7/00; F16H 7/12; F16H 7/10

[58] Field of Search ............ 74/226, 227, 242.11 R, 74/242.15 R

[56] References Cited

UNITED STATES PATENTS

| | | | |
|---|---|---|---|
| 488,698 | 12/1892 | Payne | 74/227 X |
| 782,978 | 2/1905 | Magruder | 74/227 |
| 952,156 | 3/1910 | Trewhella | 74/242.11 A |
| 1,776,419 | 9/1930 | Dodge | 74/242.11 A X |
| 1,978,582 | 10/1934 | Jones | 74/227 X |
| 2,090,423 | 8/1937 | Morrell | 74/242.11 A |
| 2,619,736 | 12/1952 | Geldhof | 74/242.15 R |
| 3,330,049 | 7/1967 | Helton | 34/139 |
| 3,402,617 | 9/1968 | Fox | 74/227 |
| 3,608,389 | 9/1971 | Christian | 74/242.9 |
| 3,864,986 | 2/1975 | Bochan | 74/226 |

Primary Examiner—Leonard H. Gerin
Attorney, Agent, or Firm—Frederick P. Weidner; Francis H. Boos

[57] ABSTRACT

A belt drive mechanism for transmitting torque between a driving rotatable member and a driven rotatable member through a drive belt which is an automatic belt tightener. Included is a freely-riding pulley assembly pivotable about the driving member as a center and including two pulleys with outside diameter flanges and reduced interior diameters having their longitudinal axes of rotation parallel and a fixed distance apart. The driving member has its longitudinal axis of rotation parallel to the rotational axes of the pulleys and is arranged in a wedge-like relationship therebetween. The flanges of each pulley are in contact with the driving member and the drive belt passes over the driving member and then over the reduced diameter of both of the flanged pulleys. By this arrangement, the belt has imparted to it a driving force delivered by the driving member and both of the pulleys.

12 Claims, 4 Drawing Figures

BELT DRIVE MECHANISM

BACKGROUND OF THE INVENTION

1. Field of the Invention

The present invention relates to an automatic belt tightener and, more particularly, to a belt drive mechanism for transmitting torque between a driver and a rotatable member to be driven thereby, making use of such an automatic belt tightener and drive mechanism for ensuring transfer of torque between the driver and the driven member and, further, for automatically taking up any slack that may be present in such a belt drive arrangement.

2. Description of the Prior Art

The rotational velocity of an element being rotated, such as the drum of a domestic clothes dryer, is oftentimes critical and is necessary to be kept within given small tolerances in order to maintain the proper tumbling of clothes in the drum. This is especially so since the outside diameter or surface of the dryer tumbling drum is commonly used as a large pulley. Various belt tightener mechanisms have been utilized in the past for rotating the clothes dryer drum. An example is found in U.S. Pat. No. 3,330,049. Typically, such an arrangement involves the belt being driven by a single pulley attached to the motor shaft. An idler pulley assembly is utilized to provide belt tension; however, it has no driving capabilities. Another automatic belt tightener mechanism is shown in U.S. Pat. No. 3,864,986, assigned to the same assignee as the present application, wherein a mechanism is shown which has a roller assembly which pivots about the rotational axis of the driving member in a direction corresponding to the direction of rotation of the driving member for allowing any slack in the belt to be taken up automatically. Again, the belt is being driven by a single driving member, namely the motor shaft. It is desirable in a belt drive mechanism to have the belt driven not only by the driving member but by other members to thereby increase the frictional surface contact with the belt, thus imparting maximum torque transfer to the belt with a minimum of slipping.

Furthermore, in production application, a tolerance is necessary in belt lengths; and means, preferably automatic, must be provided for taking up the slack that may result in a belt drive system due to this tolerance. Also, with use and age, the belt tends to lengthen and it is desirable that means should be provided for automatically taking up the slack that results.

The prior art has taught the use of idler roller tensioners, as mentioned above, which are usually spring-loaded to effect this operation. One such application is also shown in U.S. Pat. No. 3,211,015-Bochan, assigned to the same assignee as the present invention. There is, however, no suitable, low-cost way of combining the functions of taking up the belt slack and increasing the frictional drive engagement automatically, thereby eliminating the idler roller tensioners.

By the present invention, these deficiencies may now be overcome and the mechanism of the invention is highly reliable, efficient, and of low cost.

SUMMARY OF THE INVENTION

In accordance with the present invention, there is provided a belt drive mechanism for transmitting torque between a driving rotatable member and a driven rotatable member through a drive belt and which is an automatic belt tightener. Included is a pulley assembly pivotable about the driving member as a center and including two pulleys with outside diameter flanges and reduced interior diameters having their longitudinal axes of rotation parallel and spaced a fixed distance apart. The driving member has its longitudinal axis of rotation parallel to the rotational axes of the pulleys and is arranged in a wedge-like relationship therebetween. The flanges of each pulley are in contact with the driving member and the drive belt passes over the driving member and then over the reduced diameter of both of the flanged pulleys. By this arrangement, the belt has imparted to it a driving force delivered by the driving member and both of the pulleys.

DESCRIPTION OF THE PREFERRED EMBODIMENT

Figure 1:
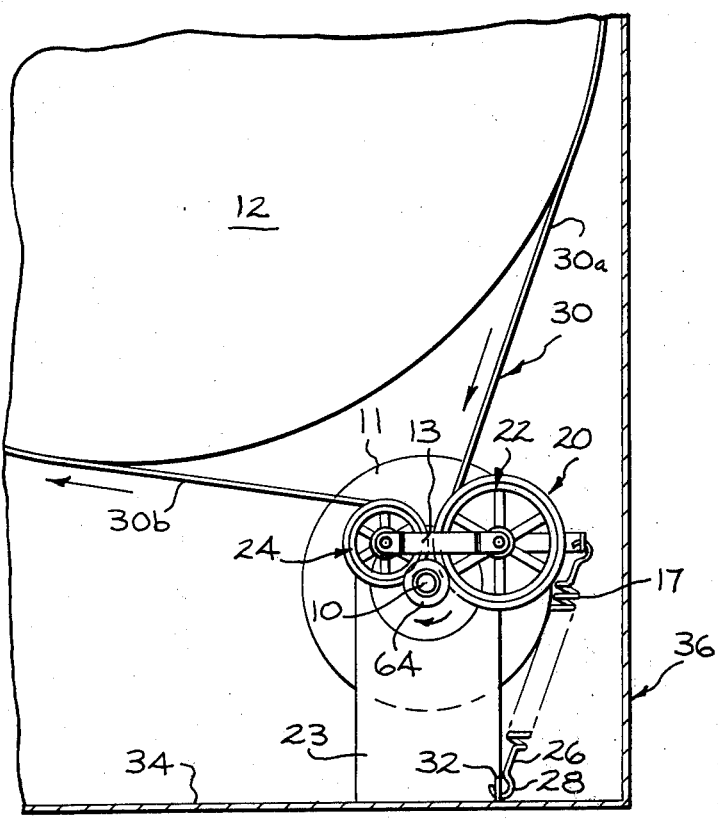
FIG. 1 is a view of a clothes dryer machine, partially broken away, showing one embodiment of the drive belt mechanism of the present invention.
Figure 3:
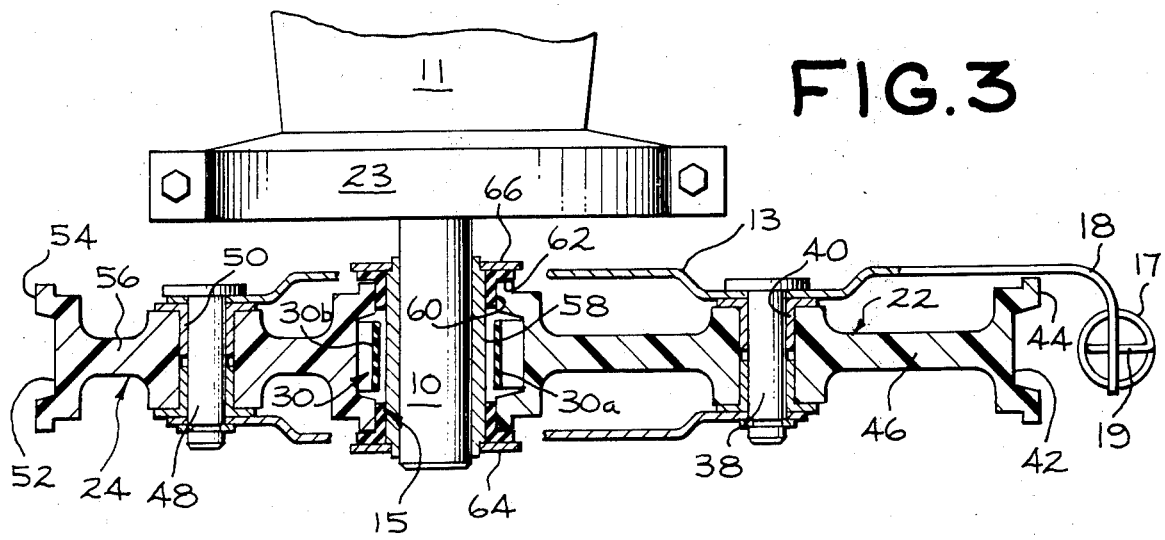
FIG. 3 is a top elevational view partially in section taken along lines 3—3 of FIG. 2, showing the belt drive mechanism in full.
Figure 2:
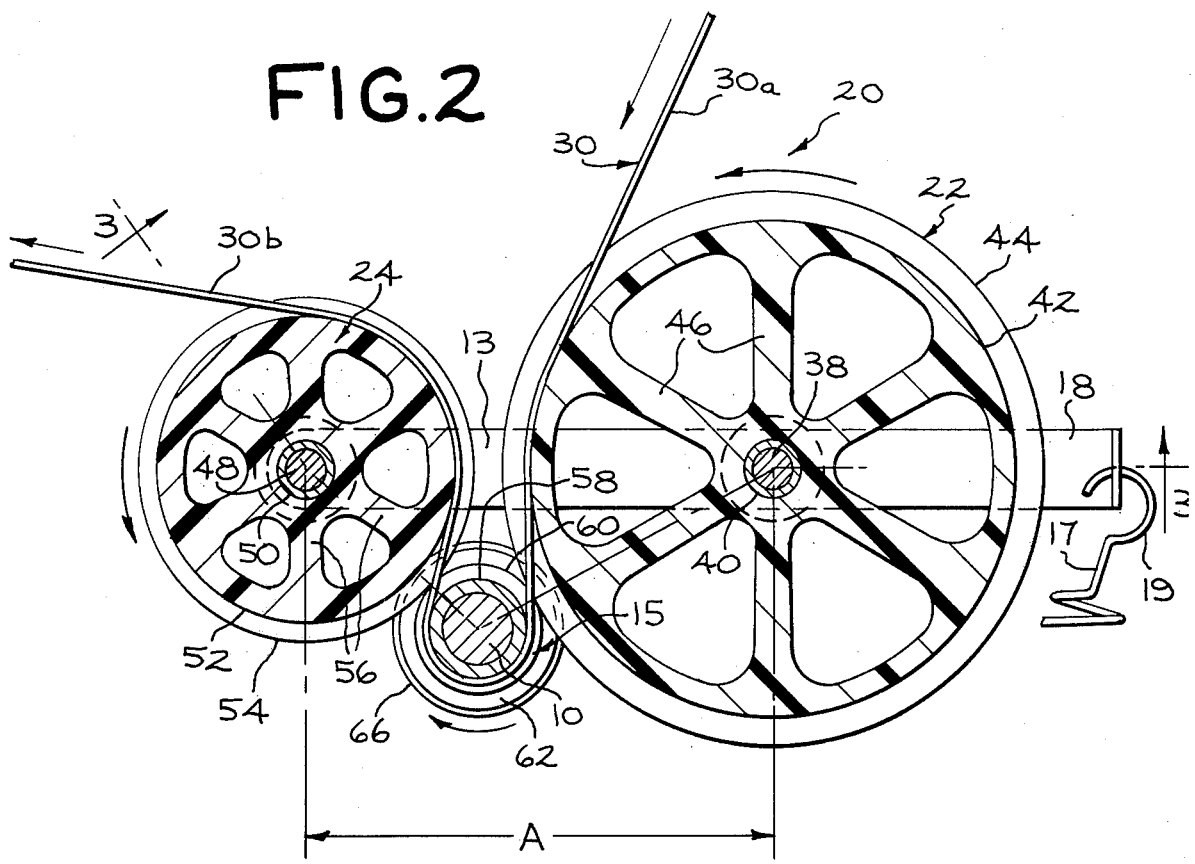
FIG. 2 is an enlarged sectional view of the belt drive mechanism shown in FIG. 1.

Referring generally to FIGS. 1, 2 and 3, there is shown a belt driven mechanism for transmitting torque between a driving rotatable member, such as a drive shaft 10 of a motor 11, and a rotatable member 12 driven by the belt 30, such as the rotating drum of a domestic clothes dryer.

In accordance with the present invention, in one embodiment thereof, an automatic belt tightener and drive mechanism comprises a pulley assembly, denoted generally as 20, that is an assembly independent of and pivotable about shaft 10. Included are two rotatable pulleys, such as first pulley 22 and second pulley 24, that have their longitudinal rotational axes parallel. Connecting the axes of both pulleys 22 and 24 is a rigid separating member 13. As an assembly, then, pulleys 22 and 24 have their respective longitudinal axes of rotation spaced apart by a fixed distance, denoted as A in FIG. 2.

Shaft 10 is rotatable but in a stationary position as the motor 11 is secured in place by a mounting bracket 23 attached to the base of the cabinet 36. Shaft 10 has secured to it for rotation therewith a pulley 15. At one end of the rigid separating member 13, remote from the axes of the pulleys 22 and 24, is a spring 17 which is secured to end 18 of the rigid separating member 13 by a hook portion 19, while the opposite end 26 of the spring 17, having a hook portion 28, is secured to a stationary member 32 which in turn may be secured to the base 34 of cabinet 36.

The pulley drive mechanism assembly 20 is arranged in a wedge-like relationship to the shaft 10 and attached pulley 15, such that the longitudinal axis of rotation of the shaft 10 is parallel with the longitudinal axis of rotation of the pulleys 22 and 24.

With particular reference to FIGS. 2 and 3, there will be described the more detailed structure arrangement of the drive pulley mechanism, showing the cooperative relationship between the components thereof, to accomplish the desired function of the mechanism.

Pulley 22 rotates about its axle 38 which has a bearing 40 secured to the rigid separating member 13. This arrangement allows pulley 22 to rotate during operation of the mechanism. Pulley 22 has a reduced interior diameter that is a flat or smooth surface 42 which is located within the flanged periphery 44 and it is spaced radially outwardly of the axle 38 by a plurality of spokes 46. Pulley 24 is structurally arranged in the same manner as pulley 22 and the elements thereof consist of an axle 48, a bearing 50, a smooth reduced interior diameter surface 52, flanged periphery 54, and with the smooth interior surface separated or spaced from the axle 48 by spokes 56.

Shaft 10 has secured to it for rotation therewith a pulley 15 comprising a smooth interior surface 58 and radially outward thereof is a driving surface 60 bounded laterally by perpendicular guide walls 62 which are held in their respecitve positions, relative to the center of the pulley 15, by retaining members 64 and 66.

A belt, such as endless, flat drive belt 30, serves to transmit torque between shaft 10 and a driven rotatable member, such as a clothes retaining drum 12 of a domestic dryer. FIG. 2 is in cross-section to show more clearly the path of travel of drive belt 30. The direction of travel of drive belt 30 has been denoted in FIG. 2 by arrows, with section 30 (a) being under greater tension than section 30 (b) when shaft 10 rotates in a clockwise direction, as indicated by an arrow in the drawing. Tracing the path, then, of drive belt 30, it proceeds around first pulley 22 and is in contact with smooth reduced interior diameter surface 42, between the first pulley 22 and shaft 10, passing more than half-way around the pulley 15 and in contact with the smooth reduced interior diameter pulley surface 58 thereof, exiting between shaft 10 and the second pulley 24, passing partially therearound, and in contact with the reduced interior diameter surface 52 thereof, to proceed to the driven rotatable drum 12. It will be noted that the flanged periphery 44 of pulley 22 rides on driving surface 60 of pulley 15 and the flanged periphery 54 of pully 24 also rides on driving surface 60 of pulley 15.

As torque is applied to shaft 10 by the motor causing the shaft 10 to rotate in a clockwise direction then, the tightening within the system will cause pulleys 22 and 24, respectively, to exert radial forces "F" against belt 30 normal to shaft 10, so as to effectively wedge the belt against the pulley 15 to effect driving engagement therebetween. Also, the rotation of pulley 15 causes driving rotation of both pulleys 22 and 24 which, in addition to pulley 15, exert driving force upon the belt 30. This is particularly advantageous since a large surface area contact between belt 30 and the reduced interior diameter surfaces 42 and 52, respectively, of pulleys 22 and 24, is achieved thus reducing slippage of the belt and increasing traction. Furthermore, by this arrangement, automatic belt tensioning is accomplished because belt 30 tightens and, as greater torque is transmitted by shaft 10, the wedging effect of the belt against the pulley 15 will become even greater, thereby effecting even greater driving engagement therebetween. In other words, the greater the torque transmitted, the greater the ability to transmit torque. It should be noted that by this arrangement the belt is only driven and does not function as a guide for aligning the pulleys thus affording longer belt life due to reduced stress as compared to other such pulley arrangements that use the belt as a guide. For a particular system in which the belt drive mechanism is used, the relative diameters of pulleys 22 and 24 will determine the tension applied to the belt. The diameters of the pulleys may be varied to accommodate a particular belt and the arrangement shown in FIGS. 1–3 would be similar to that used in a clothes dryer.

In a condition when belt 30 has excess length, as motor torque is applied to the shaft 10, portion 30 (a) of the belt becomes taut and portion 30 (b) becomes slack. This unbalance of forces causes the whole belt drive assembly 20 to pivot clockwise about shaft 10, because belt portion 30 (a) tries to approach a straight line as a limit. The geometry of the system is such that, as the assembly 20 pivots, then belt slack in belt portion 30 (b) will be taken up by further wrapping of the belt around pulley 24. While a flat belt 30 is shown and described herein, this belt drive mechanism may also utilize a V-belt or a multiple or poly V-belt wherein the traction face has ribs and grooves that are received in complementary ribs and grooves in the reduced diameter surfaces of the pulleys.

Spring biasing force, as afforded by spring 17, is not necessary in the operation of my belt drive mechanism. However, spring 17 is constructed and arranged to afford a slight biasing force to take up and compensate for any possible manufacturing tolerance variations in the assembly and to prevent any possible bouncing effect during startup. Without the slight biasing force applied to the pulley assembly, the assembly would be completely freely-riding on the belt 30 and rotatable about shaft 10, depending upon the torque or tension conditions of belt 30.

Figure 4:
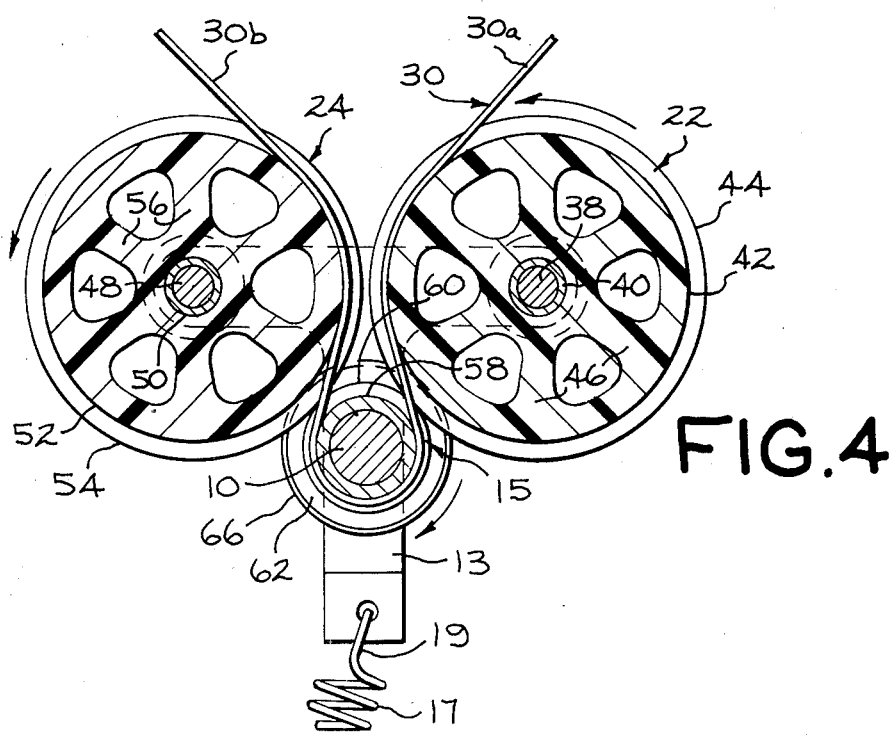
FIG. 4 is an alternate embodiment of the belt drive mechanism shown in FIGS. 1-3.

An alternate embodiment of this invention is shown in FIG. 4. Certain portions of the alternate embodiment are identical to those set forth in the embodiment shown in FIGS. 1–3 and are therefore referenced with the same numerals. The only difference in the structural arrangement of the pulley assembly is that pulleys 22 and 24 are shown having the same diameter and that the rigid separating member 13 is T-shaped and having spring 17 secured to the bottom of the T to exert slight biasing force of the pulley assembly toward the shaft 10. This embodiment allows the belt tension to be equal in either clockwise or counterclockwise rotation of the shaft 10.

It should be apparent to those skilled in the art that the embodiments described heretofore are considered to be the presently prefrred forms of this invention. In accordance with the Patent Statutes, changes may be made in the disclosed mechanism in the manner in which it is used without actually departing from the true spirit and scope of this invention.

What is claimed is:

1. In a belt drive mechanism for transmitting torque between a driving rotatable member and a driven rotatable member through a drive belt, a belt tensioner comprising:
   a pulley assembly pivotable about the driving member as a center and including two pulleys with outside diameter flanges, reduced interior diameters, and having their longitudinal axes of rotation parallel and spaced a fixed distance apart; the driving member having its longitudinal axis of rotation parallel to the rotational axes of the pulleys and arranged in a wedge-like relationship therebetween, the flanges of each pulley being in contact with the driving member; and the drive belt passing over the driving member and then over the reduced diameter of both of the flanged pulleys.

2. The belt drive mechanism of claim 1, wherein the driving member has a reduced interior diameter.

3. The belt drive mechanism of claim 2, wherein the belt is supported and driven by the reduced interior diameter of both pulleys and the driving member.

4. The belt drive mechanism of claim 1, wherein, as torque is applied to the driving member, the pulley assembly may pivot with respect to the longitudinal rotational axis of the driving member in a direction corresponding to the direction of rotation of the driving member for taking up, automatically, any slack by the passing of the belt further around the second pulley to effect proper belt tensioning.

5. The belt drive mechanism of claim 1, wherein the pulleys are maintained in a spaced fixed distance apart by a frame member with the respective pulleys being rotatably secured to said frame member.

6. The belt drive mechanism of claim 5 wherein the frame member is biased toward the driving member.

7. In a domestic clothes dryer having a belt drive mechanism for transmitting torque between a driving rotatable member and a rotatable clothes-retaining drum through an endless drive belt, an automatic belt tensioner comprising:
 a pulley assembly pivotable about the driving member as a center and including two pulleys with outside diameter flanges, reduced interior diameters, and having their longitudinal axes of rotation parallel and spaced a fixed distance apart, the driving member having its longitudinal axis of rotation parallel to the rotational axes of the pulleys and arranged in a wedge-like relationship therebetween, the flanges of each pulley being in contact with the driving member; and
 the drive belt passing over the driving member, over the reduced diameter of both of the flanged pulleys, and the drum.

8. In a domestic clothes dryer having a belt drive mechanism in accordance with claim 7 wherein the driving member has a reduced interior diameter.

9. In a domestic clothes dryer having a belt drive mechanism in accordance with claim 7 wherein the belt is supported and driven by the reduced interior diameter of both pulleys and the driving member.

10. In a domestic clothes dryer having a belt drive mechanism in accordance with claim 7 wherein, as torque is applied to the driving member, the pulley assembly may pivot with respect to the longitudinal rotational axis of the driving member in a direction corresponding to the direction of rotation of the driving member for taking up, automatically, any slack by the passing of the belt further around the second pulley to effect proper belt tensioning.

11. In a domestic clothes dryer having a belt drive mechanism in accordance with claim 7 wherein the pulleys are maintained in a spaced, fixed distance apart by a frame member with the respective pulleys being rotatably secured to said frame member.

12. In a domestic clothes dryer having a belt drive mechanism in accordance with claim 11 wherein the frame member is biased toward the driving member.

* * * * *